United States Patent
Ren et al.

(10) Patent No.: US 7,314,493 B2
(45) Date of Patent: Jan. 1, 2008

(54) FUEL COMPOSITION IN FUEL CARTRIDGES FOR DMFCS

(75) Inventors: Xiaoming Ren, Menands, NY (US); Kevin J. Shufon, Troy, NY (US); Frank W. Kovacs, Waterford, NY (US)

(73) Assignee: The Gillette Company, Boston, MA (US)

( * ) Notice: Subject to any disclaimer, the term of this patent is extended or adjusted under 35 U.S.C. 154(b) by 333 days.

(21) Appl. No.: 10/688,711

(22) Filed: Oct. 17, 2003

(65) Prior Publication Data

US 2005/0081433 A1  Apr. 21, 2005

(51) Int. Cl.
*C10L 1/12* (2006.01)
*C10L 1/18* (2006.01)

(52) U.S. Cl. ............... 44/318; 44/320; 44/444; 44/446; 44/448

(58) Field of Classification Search ............ 44/318, 44/320, 444, 446, 448
See application file for complete search history.

(56) References Cited

U.S. PATENT DOCUMENTS

| | | | |
|---|---|---|---|
| 2,814,635 | A | 11/1957 | Scheel et al. |
| 3,869,262 | A | 3/1975 | Mayerhoffer et al. |
| 4,261,702 | A | 4/1981 | Sweeney et al. |
| 5,338,888 | A | 8/1994 | Paust et al. |
| 5,599,638 | A | 2/1997 | Surampudi et al. |
| 5,904,740 | A | 5/1999 | Davis |
| 6,265,528 | B1 | 7/2001 | Hagen et al. |
| 6,554,877 | B2 | 4/2003 | Finkelshtain et al. |
| 6,604,598 | B1 * | 8/2003 | Rohde et al. ........... 180/271 |
| 6,864,001 | B2 * | 3/2005 | Zhang et al. ........... 429/15 |
| 2002/0083640 | A1 | 7/2002 | Finkelshtain et al. |
| 2003/0157018 | A1 | 8/2003 | Zaluski et al. |
| 2004/0033397 | A1 | 2/2004 | Colbow et al. |
| 2004/0265652 | A1 | 12/2004 | Soucy |

FOREIGN PATENT DOCUMENTS

| | | |
|---|---|---|
| EP | 1 328 033 A2 | 7/2003 |
| GB | 1 272 974 A | 5/1972 |
| JP | 2001-093558 * | 4/2001 |
| JP | 2001 093558 A | 4/2001 |
| WO | WO0021772 * | 4/2000 |
| WO | WO 2004/010717 A2 | 1/2004 |

OTHER PUBLICATIONS

Szele et al., "Solvolysis Reactions of tert-Butyl Chloride and Methyl Tosylate in Trimethoxyborane Methanol Mixtures", Croatica Chemica Acta, 1977, pp. 47-56, vol. 49, No. 1, Laboratory of Organic Chemistry and Biochemistry, Faculty of Science, University of Zagreb, Yugoslavia.
Deslongchamps et al., "The Relative Rate of Hydrolysis of a Series of Acyclic and Six-Membered Cyclic Acetals, Ketals, Orthoesters, and Orthocarbonates", TETRAHEDRON, 2000, pp. 3555-3537, vol. 56, Sherbrooke University, Quebec, Canada.
Albert M et al., "Vapor-liquid and liquid-liquid equilibria in a binary and ternary mixtures of water, methanol, and methylal", Journal of Chemical and Engineering Data, Jul./Aug. 2001, pp. 897-903, vol. 46, No. 4, Engineering Information, Inc., New York, NY, USA.
PCT/US2004/032021, Notification of Transmittal of the International Search Report and the Written Opinion of the International Search Authority or the Declaration, European Patent Office, Aug. 6, 2005.
XP002314822, Compendex/E1, Database Accession No. E2001356634349 entitled Vapor-liquid and liquid-liquid equilibria in binary and ternary mixtures of water, methanol, and methylal, Engineering Information Inc., New York, NY.
XP002322068, WPI/Derwent, Database Accession No. 1995-213270 [28], entitled Methyl alcohol compsn. for automobile fuel—prepd. by adding dye to methyl alcohol for easy detection of leakage, London, Great Britain.
U.S. Appl. No. 10/413,983, filed Apr. 15, 2003, Ren et al., entitled Direct Oxidation Fuel Cell Operating with Direct Feed of Concentrated Fuel Under Passive Water Management.
U.S. Appl. No. 10/413,986, filed Apr. 15, 2003, Hirsch et al., entitled Vapor Feed Fuel Cell System with Controllable Fuel Delivery.

* cited by examiner

*Primary Examiner*—Cephia D. Toomer
(74) *Attorney, Agent, or Firm*—Cesari and McKenna LLP

(57) ABSTRACT

Fuel mixtures for direct methanol fuel cells are disclosed. The fuels include methanol and additives that react with water to produce methanol and other easily electro-oxidizable compounds including dimethyloxymethane, methylorthoformate, tetramethylorthocarbonate, trimethylborate, and tetramethylorthosilicate. Other additives to improve safety and efficiency of the fuel cell include sulfonated activated carbon particles and metal hydrides, such as $LiAlH_4$, $NaBH_4$, $LiBH_4$, $(CH_3)_2 NHBH_3$, $NaAlH_4$, $B_2H_6$, $NaCNBH_3$, $CaH_2$, $LiH$, $NaH$, $KH$ or sodium bis (2-methoxyethoxy) dihydridaluminate.

10 Claims, No Drawings

FUEL COMPOSITION IN FUEL CARTRIDGES FOR DMFCS

BACKGROUND OF THE INVENTION

1. Field of the Invention

This invention relates generally to direct methanol fuel cells, methods for producing electricity using those fuel cells, and fuel compositions for direct methanol fuel cells (DMFCs) including additives to those fuels.

2. Background Information

Fuel cells are devices in which electrochemical reaction involving fuel molecules and oxygen are used to generate electricity. Methanol is an attractive fuel choice for some applications due to the its high specific energy and the relatively fast electrokinetics with which it can be oxidized to generate electricity.

In direct oxidation fuel cells, a carbonaceous liquid fuel (typically methanol or an aqueous methanol solution) is introduced to the anode face of a membrane electrode assembly (MEA). Those skilled in the art will recognize that other compounds and mixtures may be added to the methanol or methanol/water fuel, and may be used as fuels, such as ethanol and other alcohols and alcohol precursors, and aqueous solutions thereof.

Examples of DFMCs include the Vapor Feed Fuel Cell System with Controllable Fuel Delivery, disclosed in commonly assigned Ser. No. 10/413,986, filed Apr. 15, 2003, and Direct Oxidation Fuel Cell Operating with Direct Feed of Concentrated Fuel under Passive Water Management, Ser. No. 10/413,983 filed Apr. 15, 2003 the disclosures of which are incorporated herein by reference.

Methods for refueling fuel cells and fuel cell powered devices are disclosed in commonly assigned application Methods of Providing Refueling for Fuel Cell Powered Devices, Ser. No. 10/607,699 filed Apr. 15, 2003 the disclosure of which is incorporated herein by reference.

Methanol, $CH_3OH$ (C.A.S. No. 67-56-1) is a clear, colorless, flammable liquid or vapor that is toxic and can be harmful or fatal if inhaled, adsorbed through the skin or swallowed. Methanol has a flash point of 11° C., and autoignites at 464° C. Concentrations of about 6 to about 36 percent by volume burn in air if ignited. Methanol is a Class 3 Flammable liquid, U.N. number 1230, and transportation of methanol is regulated by the U.S. Department of Transportation and the International Civil Aviation Organization. Presently, transportation of methanol is prohibited in the passenger compartments and checked baggage of passengers travelling by air. Current DOT regulations provide 24% aqueous solutions of methanol are not hazardous, but ICAO regulations do not make any such provision.

As use of DMFCs increases in small electronic devices, large numbers of fuel cells, each containing methanol, will be exposed to the public in a wide variety of environments and circumstances.

A fuel cartridge or fuel tank placed in a direct methanol fuel cell anode compartment and containing a highly concentrated methanol solution or neat methanol will absorb or pick up water produced from the fuel cell electrode reaction. A membrane that separates the highly concentrated methanol solution or neat methanol within the tank or cartridge from the cell anode is called methanol delivery membrane or film. Water absorption across the methanol delivery membrane is driven by the water concentration or activity difference between the cell electrode and the highly concentrated methanol solution or neat methanol. The consequence of water uptake in the fuel cartridge or fuel tank is dilution of the methanol by water inside the fuel tank or cartridge. This decrease in the methanol concentration in turn causes a decrease in methanol transport rate through the membrane, and thus the methanol feed rate to the cell anode. Consequently, the fuel cell power output decreases during cartridge life. Moreover, the power demand on a fuel cell is not constant, and in many applications a power surge is demanded when the circuit is closed to allow the device to start up. Although the water uptake can be minimized to a level by using a membrane that is highly selective to the transport of methanol over water, completely eliminating water uptake may be difficult to achieve using materials that are currently commercially available. As such, we have now found it may be advantageous or desirable to add certain compounds to the fuel in order to improve the effectiveness of the fuel cell system under given conditions.

Direct oxidation fuel cell systems for portable electronic devices should be as small as possible at the power output required. The power output is governed by the rate of the reactions that occur at the anode and the cathode of the fuel cell. More specifically, the anode process in direct methanol fuel cells based on acidic electrolytes, including polyperflourosulfonic acid and similar polymer electrolytes, involves a reaction of one molecule of methanol with one molecule of water. In this process, the oxygen atom in the water molecule is electrochemically activated to complete the oxidation of methanol to a final $CO_2$ product in a six-electron process, according to the following chemical equation $$CH_3OH + H_2O = CO_2 + 6H^+ + 6e^- \qquad (1)$$

Since water is a reactant in this anodic process at a molecular ratio of 1:1 (water:methanol), the supply of water, together with methanol, to the anode at an appropriate weight (or volume) ratio is critical for sustaining this process in the cell. In fact, it has been known that the water:methanol molecular ratio in the anode of the DMFC has to significantly exceed the stoichiometric, 1:1 ratio shown by process (1). This excess is required to guarantee complete, 6 electron anodic oxidation to $CO_2$, rather than partial oxidation to either formic acid, or formaldehyde, $4e^-$ and $2e^-$ processes, respectively, described by equations (2) and (3) below:

$$CH_3OH + H_2O = HCOOH + 4H^+ + 4e^- \qquad (2)$$

$$CH_3OH = H_2CO + 2H^+ + 2e^- \qquad (3)$$

Equations (2) and (3) describe partial processes that are not desirable and which might occur if anode water content is not sufficient during a steady state operation of the cell. Particularly, as is indicated in process (3), involving the partial oxidation of methanol, water is not required for this anode process and thus, this process may dominate when the water level in the anode drops below a certain point. The consequence of process (3) domination, is an effective drop in methanol energy content by 66% compared with consumption of methanol by process (1), which would result in a lower cell electric energy output. In addition, it might lead to the generation of a hazardous anode product (formaldehyde).

U.S. Pat. No. 6,554,877 discloses a liquid fuel composition for electrochemical fuel cells including dilute aqueous solutions of methanol with an auxiliary fuel that is a hydrogen containing inorganic compound.

U.S. Pat. No. 5,904,740 discloses a fuel for fuel cells comprising methanol and formic acid that is substantially free of mineral acids.

U.S. Pat. No. 5,599,638 discloses aqueous methanol solutions for fuel cells optionally including additives.

It is thus an object of the present invention to provide a concentrated (i.e. a fuel that contains a fuel with a methanol: water ratio of at least 1: 1) fuel and fuel additives for DMFCs that overcome the above difficulties to provide extended life and increase energy density and power output for fuel cell systems.

Another object of the present invention is to provide a fuel that includes organic compounds that undergo rapid reaction with water to yield hydrocarbons including methanol suitable for fuel in the cell. In this aspect, the fuel mixture will allow improved consistency of fuel delivery to the anode of the fuel cell by reacting with water that passes from the anode aspect of the fuel cell into the fuel mixture. By doing so, a more consistent mixture of fuel will be delivered to the fuel cell system, resulting in improved uniformity of power output from the cell as fuel is consumed. Moreover, because there is preferably little or no water in the fuel mixture, these fuel mixtures are more stable than in other fuels for direct oxidation fuel cell systems.

In another object of this invention, the improved uniformity of fuel delivery will reduce or eliminate the period of low power output near the end of a fuel supply's useful life.

Still another advantage of the present invention is the reduction and elimination of the potential release of methanol fuel from cartridges that are disposed of improperly when a user perceives that the cartridge is exhausted, because the concentration of methanol is too low to provide a feed rate to the cell that provides acceptable power even though the cartridge contains too high a concentration of methanol to be discarded safely.

Another object of the present invention is to provide improved safety of DFMCs by including an indicator in the fuel that will signal a person that there has been a release of methanol fuel from the fuel cell cartridge.

Still another object of the present invention is to provide improved fuel cell power pack energy content by enabling improved fuel delivery from the fuel cartridge to the fuel cell system.

SUMMARY OF THE INVENTION

The above and other objectives are achieved by the fuel additive compositions and fuel formulations described herein.

In one aspect of the invention, the fuel is a highly concentrated, preferably anhydrous methanol solution. Other components of the fuel include organic molecules that react rapidly with water to produce methanol and other compounds that are rapidly and easily oxidized in the fuel cells. Examples of molecules that may be added to the methanol include dimethyloxymethane, methylorthoformate, tetramethylorthocarbonate, trimethylborate, and tetramethylorthosilicate.

Another aspect of the invention is the addition of hydrogen containing inorganic compounds, such as metal hydrides such as $LiAlH_4$, $NaBH_4$, $LiBH_4$, $(CH_3)_2NHBH_3$, $NaAlH_4$, $B_2H_6$, $NaCNBH_3$, $CaH_2$, $LiH$, $NaH$, $KH$ or sodium bis (2-methoxyethoxy) dihydridaluminate, which can react with water to liberate hydrogen that can be consumed as a fuel.

Another aspect of the present invention provides an indicator that can provide an observable indication that the fuel cell has released methanol fuel. Examples of the indicators include low concentrations of activated carbon black, and high molecular weight polymers with functional groups including, for example, chromatic functional groups. In addition, additives which add other properties to improve the ability to signal the presence of the fuel mixture, including but not limited to bitter tasting compounds such as denatonium benzoate may be added to the fuel mixture.

In another aspect of this invention, additives and mixtures of additives from each of the above classes of additives may be combined with methanol in a fuel cell advantageously.

DETAILED DESCRIPTION

Illustrative embodiments of the invention are now described.

Additives are mixed with neat methanol to form the fuel for the DMFC. The fuel can be stored within fuel tank or fuel cartridge, or in a package suitable to refill a cartridge.

In one case, the additives include one or more of chemical compounds that can undergo rapid reaction with water. Preferably those compounds react with water to produce methanol or other small molecules that can be easily electrooxidized. By using these preferred compounds, the fuel energy content is not reduced by the additives in the fuel mixture. When the additives are mixed with neat methanol, the fuel mixture will maintain a low water level within the fuel tank during the fuel cell run by reacting with the water entering the fuel tank, producing additional fuel. Consequently, a steady methanol supply rate to the cell anode can be achieved during the entire cartridge usage life span.

The following are examples of fuel compositions including fuel precursors and illustrates the reactions for breaking down the precursor to fuel molecules.

1. MeOH and Dimethyloxymethane as Fuel Mixture.

The reaction of Dimethyloxymethane with water is described as follows

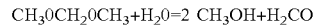
$CH_3OCH_2OCH_3 + H_2O = 2\ CH_3OH + H_2CO$

2. MeOH and Methylorthoformate as Fuel Mixture

The reaction of Methylorthoformate with water is described as follows

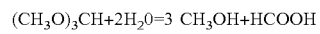
$(CH_3O)_3CH + 2H_2O = 3\ CH_3OH + HCOOH$

3. MeOH and Tetramethylorthocarbonate as Fuel Mixture

The reaction of Tetramethyl-orthocarbonate with water is described as follows:

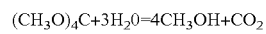
$(CH_3O)_4C + 3H_2O = 4CH_3OH + CO_2$

4. MeOH and Trimethylborate as Fuel Mixture

The reaction of Trimethylborate with water is described as follows

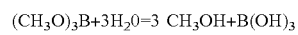
$(CH_3O)_3B + 3H_2O = 3\ CH_3OH + B(OH)_3$

5. MeOH and Tetramethylorthosilicate as Fuel Mixture

The reaction of Tetramethyl-orthosilicate with water is described as follows

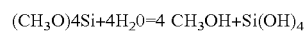
$(CH_3O)4Si + 4H_2O = 4\ CH_3OH + Si(OH)_4$

Table I lists the physical properties of the additives and the energy density of the fuel mixture.

TABLE 1

Some physical properties of fuel additives, together with their reaction products with water.

| | M.P. | B.P | Hydrolysis Products | Density | MW | Wh/cc |
|---|---|---|---|---|---|---|
| Methanol | | | | 0.791 | 32 | 4.77 |
| Demethyloxymethane | | 41 | $2MeOH + H_2CO$ | 0.860 | 76 | 5.82 |
| Methyl-orthoformate | | 101 | $3MeOH + HCOOH$ | 0.970 | 106 | 5.89 |
| Tetramethyl Orthocarbonate | | 114 | $4MeOH + CO_2$ | 1.023 | 105 | 7.52 |
| Trimethyl Borate | −29 | 68.7 | $3MeOH + B(OH)_3$ | 0.883 | 103.91 | 4.92 |
| Tetramethyl orthosilicate | −4 | 121 | $4MeOH + Si(OH)_4$ | 1.032 | 152.22 | 5.23 |

A useful fuel composition advantageously includes one or more fuel additives mixed with neat methanol or the other fuel. Where acid is need to catalyze the hydrolysis reaction, acid such as $P_2O_5$ or solid polymer acid such as the proton form of a Nafion membrane could be used. In case of the solid polymer acid, the membrane can also be used to serve as methanol delivery membrane over the cartridge for the methanol fuel supply to the cell anode.

The fuel composition can be adjusted based on the water uptake rate for the desired methanol delivery membrane and fuel/fuel precursor ratio for use in the direct methanol fuel cell system, where the methanol delivery from the fuel tank is achieved by the methanol transport through the membrane.

For example, when a polyurethane membrane is used as the methanol delivery membrane, approximately 0.4-0.45 molecules of water typically enter the tank for every one molecule of methanol delivered to the cell anode. If a polydimethylsilane (PDMS or common silicone) membrane is used as the methanol delivery membrane, the water up-take is typically 0.2 $H_2O/MeOH$. The fuel composition is thus formulated so that the water enters the fuel cartridge will be consumed, and more preferably substantially or completely consumed, through the hydrolysis reaction with the fuel additives, and that at the end of the cartridge usage life, a minimum amount of the fuel and fuel precursor remains.

Table two lists the fuel composition when a PDMS membrane is used.

TABLE 2

Example compositions for PDMS membrane is used as the fuel delivery film, (water uptake of 0.2 mole of water per mole of methanol delivered).
Fuel Composition Additive Concentrations

| | Mole/Mole of Methanol | Wt % | V % | Fuel wh/cc |
|---|---|---|---|---|
| Methanol | | | | 4.77 |
| Dimethyloxymethane | 0.2 | 32.20 | 30.41 | 5.09 |
| Methyl-orthoformate | 0.1 | 24.88 | 12.27 | 5.01 |
| Tetramethyl Orthocarbonate | 0.1 | 24.71 | 20.24 | 5.33 |
| Trimethyl Borate | 0.07 | 17.80 | 16.24 | 4.80 |
| Tetramethyl orthosilicate | 0.05 | 19.21 | 15.42 | 4.84 |

Of course, any of these, or other compounds that react with water to produce fuel for the cell may be used. Mixtures of more than one precursor may be used advantageously. Thus, the fuel mixture could contain from any concentration from 0 to an amount greater than 30.41 percent by volume of dimethyloxymethane, or about 15% by volume dimethyloxymethane and about 8% by volume tetramethyl orthosilicate. Any combination of fuel precursors may be used. It is usually preferred to add a small excess of the precursor to ensure that the water entering the fuel is completely consumed.

Metal hydrides such as $LiAlH_4$, $NaBH_4$, $LiBH_4$, $(CH_3)_2NHBH_3$, $NaAlH_4$, $B_2H_6$, $NaCNBH_3$, $CaH_2$, LiH, NaH, KH or sodium bis (2-methoxyethoxy) dihydridaluminate may also be added to the methanol fuel to provide sustained power output in cases of high power demand on the cell. Hydrazine or hydrazine derivatives are also suitable. These hydrogen-containing inorganic compounds with a high reduction potential are good fuels for fuel cells but are very reactive. The hydrogen release from these compounds can be triggered by the heat generated by the operation of the fuel cell, particularly where the fuel cell is operating at high power and where water is present in the fuel mixture. Specific engineering concerns, such as the power surge required when the circuit is closed and the stability of the mixture dictate the concentration of the hydrogen containing inorganic compound in the fuel. This calculation is within the skill of those in the art.

The following are examples of uses of metal hydrides.

LiAlH4 as a fuel additive.

The hydrolysis reaction of lithium aluminum hydride occurs according to the following reaction:

$LiAlH_4 + 4 H_2O = 4 H_2 + LiOH + Al(OH)_3$

With a PDMS membrane as the fuel delivery film, for every mole of methanol delivered, there will be 0.2 mole of water entering the fuel cartridge. To consume this quantity of water, assuming a complete reaction, a minimum amount of 0.05 mole of Li—AlH4 will be needed. The fuel composition in LiAlH4 to MeOH mole/mole ratio is 0.05, or 5.6 wt %. If a polyurethane membrane is to be used as the methanol delivery film, for every mole of methanol delivered, there will be 0.45 mole of water entering the fuel cartridge, and to consume the water, a minimum amount of 0.1125 mole of LiAlH4 will be needed. The fuel composition in LiAlH4 to MeOH mole/mole ratio is 0.1125, or 11.8 wt %.

NaBH$_4$ as a fuel additive.

The hydrolysis reaction of Sodium tetrahydridoborate occurs according to the following reaction.

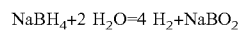
$NaBH_4 + 2 H_2O = 4 H_2 + NaBO_2$

With a PDMS membrane as the fuel delivery film, for every mole of methanol delivered, there will be 0.2 mole of water entering the fuel cartridge, and to consume the water, assuming a complete reaction, a minimum amount of 0.1 mole of NaBH$_4$ will be needed. The fuel composition in NaBH$_4$ to MeOH mole/mole ratio is 0.1, or 10.6 wt %. If a polyurethane membrane is to be used as the methanol delivery film, for every mole of methanol delivered, there will be 0.45 mole of water entering the fuel cartridge, and to consume the water, a minimum amount of 0.225 mole of $NaBH_4$ will be needed. The fuel composition in $NaBH_4$ to MeOH mole/mole ratio is 0.225, or 21.0 wt %.

$CaH_2$ as a fuel additive.

The hydrolysis reaction of Calcium hydride is described as follows

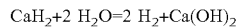

$$CaH_2 + 2\ H_2O = 2\ H_2 + Ca(OH)_2$$

With a PDMS membrane as the fuel delivery film, for every mole of methanol delivered, there will be 0.2 mole of water entering the fuel cartridge, and to consume the water, a minimum amount of 0.1 mole of $CaH_2$ will be needed. The fuel composition in $CaH_2$ to MeOH mole/mole ratio is 0.1, or 11.6 wt %. If a polyurethane membrane is to be used as the methanol delivery film, for every mole of methanol delivered, there will be 0.45 mole of water entering the fuel cartridge, and to consume the water, a minimum amount of 0.225 mole of $CaH_2$ will be needed. The fuel composition in $CaH_2$ to MeOH mole/mole ratio is 0.225, or 22.8 wt %.

NaH as a fuel additive.

The hydrolysis reaction of Sodium hydride occurs according to the following reaction.

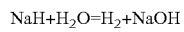

$$NaH + H_2O = H_2 + NaOH$$

With a PDMS membrane as the fuel delivery film, for every mole of methanol delivered, there will be 0.2 mole of water entering the fuel cartridge, and to consume the water, a minimum amount of 0.2 mole of NaH will be needed. The fuel composition in NaH to MeOH mole/mole ratio is 0.2, or 13.0 wt %. If a polyurethane membrane is to be used as the methanol delivery film, for every mole of methanol delivered, there will be 0.45 mole of water entering the fuel cartridge, and to consume the water, a minimum amount of 0.45 mole of NaH will be needed. The fuel composition in NaH to MeOH mole/mole ratio is 0.45, or 25.2 wt %.

Of course, more than one metal hydride may be used in a mixture, according to the needs of any particular application. Additionally, metal hydrides may be combined with fuel precursors to make a mixture that has optimum properties for any desired application.

A small amount of dye in the range of less than 0.1 wt % can be added to the fuel to render the colorless fuel liquid an indicating color of warning. Any color may be used, depending on the application of the fuel cell system. By way of example, certain colors that provide contrast with the fuel, such as dark black and deep blue may be preferred. The fuel mixture thus distinctively colored can be easily identified in the event of release from the fuel cartridge. The deep colored fuel is visible, making it easier to detect, and deters unintentional ingestion if the fuel becomes mixed with food and drink. In addition, a color can be selected to act as a substance identifier to indicate the presence of fuel and fuel precursors.

In fuel cell applications, release of fuel from the cartridge is intended to takes place only when the fuel cartridge is inserted into fuel cell power device. Preferably, a selective membrane is disposed between the fuel mixture and the fuel cell anode compartment and allows the fuel to pass through it, and reach the cell anode compartment while preventing substantially all of the additives from being introduced to the anode of the fuel cell. For this purpose, the dye (or other additive) is preferably made of relatively large molecules to provide high selectivity of fuel over the dye molecules using the available membrane materials such as polyurethane, polyester, polypropylene, polyethylene, polydimethyloxylsilane, cellulose acetate or various blend copolymers.

One example of a dye with a large molecular weight, a carbon black powder with high surface area, that can be used is the Black Pearls 2000 carbon black from Cabot Corporation. To enhance the dispersion of the carbon black particles in the fuel liquid, the surface of the carbon particles can be modified, such as surface sulfonation. The reaction of carbon surface sulfonation can be carried out by heating the carbon with concentrated sulfuric acid at 200 to 250° C., or heating the carbon with fuming sulfuric acid at 200° C. for 2 h.). Sulfonic acid group makes the carbon easily dispersed in the methanol water mixture or pure methanol. The amount modified carbon will be substantially small, such as less than 0.1% of total fuel weight; the sulfonic acid group may also act as cation exchange sites to trap mobile cations that might present in the fuel liquid. By removing cations from the fuel, the potential contamination to the fuel cells by cations is eliminated. Sulfonated activated carbon can be advantageously used in formulations that include metal hydrides. The sulfonic acid group attached to the activated carbon surface can trap metal ions in the fuel.

Colorants can be selected based on the composition of the methanol delivery film and architecture of the fuel cartridge and/or the fuel cell system, such that the additives are not introduced to the anode aspect of the fuel cell.

Similarly, an unpleasant tasting, but otherwise benign compound could be added to the mixture in order to deter ingestion of the mixture. For example, and not by way of limitation, about 100 ppm of denatonium benzoate may be added to deter ingestion of the fuel. Those skilled in the art will recognize that any number of additives can be added to create certain characteristics to improve the handling and safety of the fuel mixture, by adding or improving luminosity, odor, flame retardance and other desired attributes to the fuel mixture.

The foregoing description of the illustrative embodiments reveals the general nature of the method. Those skilled in the art will recognize that it is possible to modify, or adapt, the method disclosed without undue experimentation. The descriptions of the illustrative embodiments are illustrative, not limiting. The method has been described in detail for illustration. Variations to the specific details can be made by those skilled in the art, while remaining within the scope of the invention.

Those skilled in the art will also recognize that the inventive compositions may also be contained by a vessel other than a replaceable cartridge while still remaining within the scope of the invention.

Descriptions of a class or range useful includes a description of any subrange or subclass contained therein, as well as a separate description of each member, or value in said class.

What is claimed is:

1. A fuel for a direct methanol fuel cell comprising:
   methanol; and
   an effective amount of an additive that undergoes a reaction with water to produce small molecules that are easily electro oxidized wherein the additive is about 20 mole percent dimethyloxymethane, and an indicating dye that includes sulfonated activated carbon particles.

2. A fuel for a direct methanol fuel cell comprising:
   methanol,
   an effective amount of an additive that undergoes a reaction with water to produce small molecules that are easily electro oxidized wherein the additive is methylorthoformate in such a proportion that the fuel comprises about 10 mole percent methylorthoformate; and an indicating dye that includes sulfonated carbon particles.

3. A fuel for a direct methanol fuel cell comprising:
methanol,
an effective amount of an additive that undergoes a reaction with water to produce small molecules that are easily electro oxidized wherein the additive is tetramethylorthocarbonate in such a proportion that the fuel comprises about 10 mole percent tetramethylorthocarbonate; and
less than about 0.1% but greater then 0% by weight of an indicating dye.

4. A fuel for a direct methanol fuel cell as in claim 3 where the indicating dye includes sulfonated activated carbon particles.

5. A fuel for a direct methanol fuel cell comprising:
methanol,
an effective amount of an additive that undergoes a reaction with water to produce small molecules that are easily electro oxidized wherein the additive is trimethylborate in such a proportion the fuel comprises about 7 mole percent trimethylborate; and
an indicating dye that includes sulfonated activated carbon particles.

6. A fuel for a direct methanol fuel cell comprising:
methanol; and
an effective amount of an additive that undergoes a reaction with water to produce small molecules that are easily electro oxidized wherein the additive is tetramethylorthosilicate.

7. A fuel for a direct methanol fuel cell as in claim 6, wherein the fuel comprises about 5 mole percent tetramethylorthosilicate.

8. A fuel for a direct methanol fuel cell as in claim 7 further comprising less than about 0.1% by weight of an indicating dye.

9. A fuel for a direct methanol fuel cell as in claim 8 where the indicating dye includes sulfonated activated carbon particles.

10. A method of preparing a fuel mixture for a direct methanol fuel cell comprising the steps of:
a) providing a supply of concentrated methanol;
b) adding an additive which is a fuel precursor in an effective amount such that said additive undergoes a reaction with water to produce small molecules that are easily electro oxidized selected from the group consisting of: dimethyloxymethane, methylorthoformate, tetramethyl orthocarbonate, trimethyl borate, and tetramethyl orthosilicate; and
adding at least one metal hydride selected from the group consisting of $LiAlH_4$, $NaBH_4$, $LiBH_4$, $(CH_3)_2 NHBH_3$, $NaAlH_4$, $B_2H_6$, $NaCNBH_3$, $CaH_2$, $LiH$, $NaH$, $KH$ and sodium bis (2-methoxyethoxy) dihydridaluminate.

* * * * *